(12) United States Patent
Draper et al.

(10) Patent No.: US 8,386,562 B2
(45) Date of Patent: *Feb. 26, 2013

(54) METHOD, APPARATUS AND COMPUTER PROGRAM PRODUCT FOR PROCESSING RESPONSES TO A WEB PAGE

(75) Inventors: David Draper, Hursley (GB); Jordan Humber, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 208 days.

This patent is subject to a terminal disclaimer.

(21) Appl. No.: 12/828,348

(22) Filed: Jul. 1, 2010

(65) Prior Publication Data

US 2011/0004657 A1    Jan. 6, 2011

(30) Foreign Application Priority Data

Jul. 1, 2009  (GB) .................................. 09164261.1

(51) Int. Cl.
  *G06F 15/16* (2006.01)
(52) U.S. Cl. ........................................................ 709/203
(58) Field of Classification Search .................... 709/203
  See application file for complete search history.

(56) References Cited

U.S. PATENT DOCUMENTS

| 7,519,684 B2 | 4/2009 | Backhouse | |
| 2004/0216042 A1* | 10/2004 | Consolatti et al. ............ | 715/513 |
| 2005/0086587 A1* | 4/2005 | Balz ............................... | 715/505 |
| 2006/0168139 A1 | 7/2006 | Messinger | |
| 2008/0201648 A1 | 8/2008 | Earp | |

OTHER PUBLICATIONS

BODOFF—"Custom Tags in JSP Pages",The J2EE Tutorial, downloaded from http://java.sun.com/j2ee/tutorial/1_3-fcs/doc/JSPTags.html on Jun. 9, 2010.
SUN1—"Java Servlet Technology Overview", J2EE, downloaded from http://java.sun.com/products/servlet/overview.html on Jun. 9, 2010.
SUN2—"Class URI", downloaded from http://java.sun.com/j2se/1.4.2/docs/api/java/net/URI.html on Jun. 9, 2010.
SUN3—"Class Simple Tag Support", downloaded from http://java.sun.com/j2ee/1.4/docs/api/javax/servlet/jsp/tagext/SimpleTagSupport.html on Jun. 9, 2010.
WIKI1—"Tag (Metadata)", downloaded from http://en.wikipedia.org/wiki/Tag_(metadata) on Jun. 9, 2010.

* cited by examiner

*Primary Examiner* — Ario Etienne
*Assistant Examiner* — Hee Soo Kim
(74) *Attorney, Agent, or Firm* — David Mims; Mark P Kahler

(57) ABSTRACT

The disclosed web server and methodology processes responses to a web page. The web page is at least partially generated from one or more widgets and each widget denotes how an element of the web page is to be displayed at a client. The web server receives a response to the web page from the client. From the received response, the server identifies a widget that was used by the server to generate an element of the web page that was provided to the client. In response to this identification, the server then executes action processing logic associated with the particular widget that was used by the server to generate an element of the web page. The action processing logic for the widget uses data received in the response and performs an action with respect to that data.

6 Claims, 4 Drawing Sheets

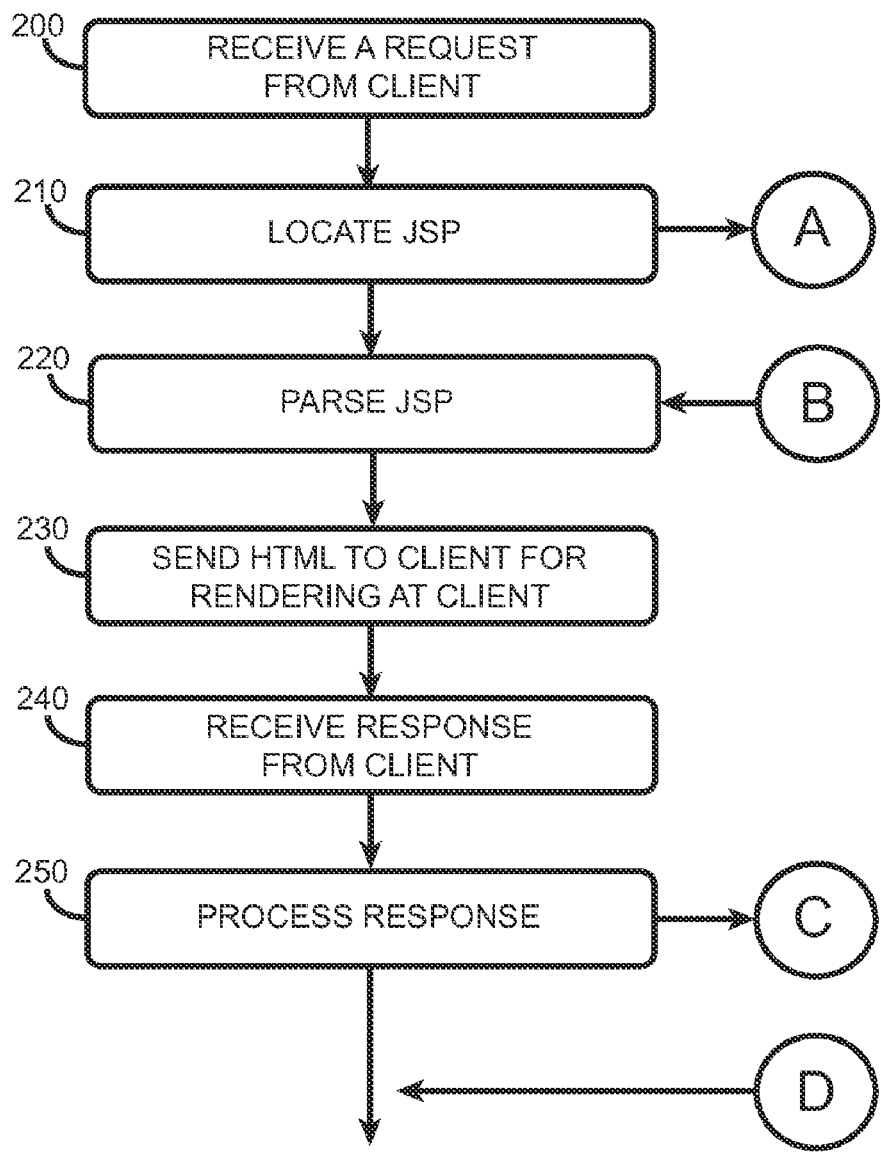

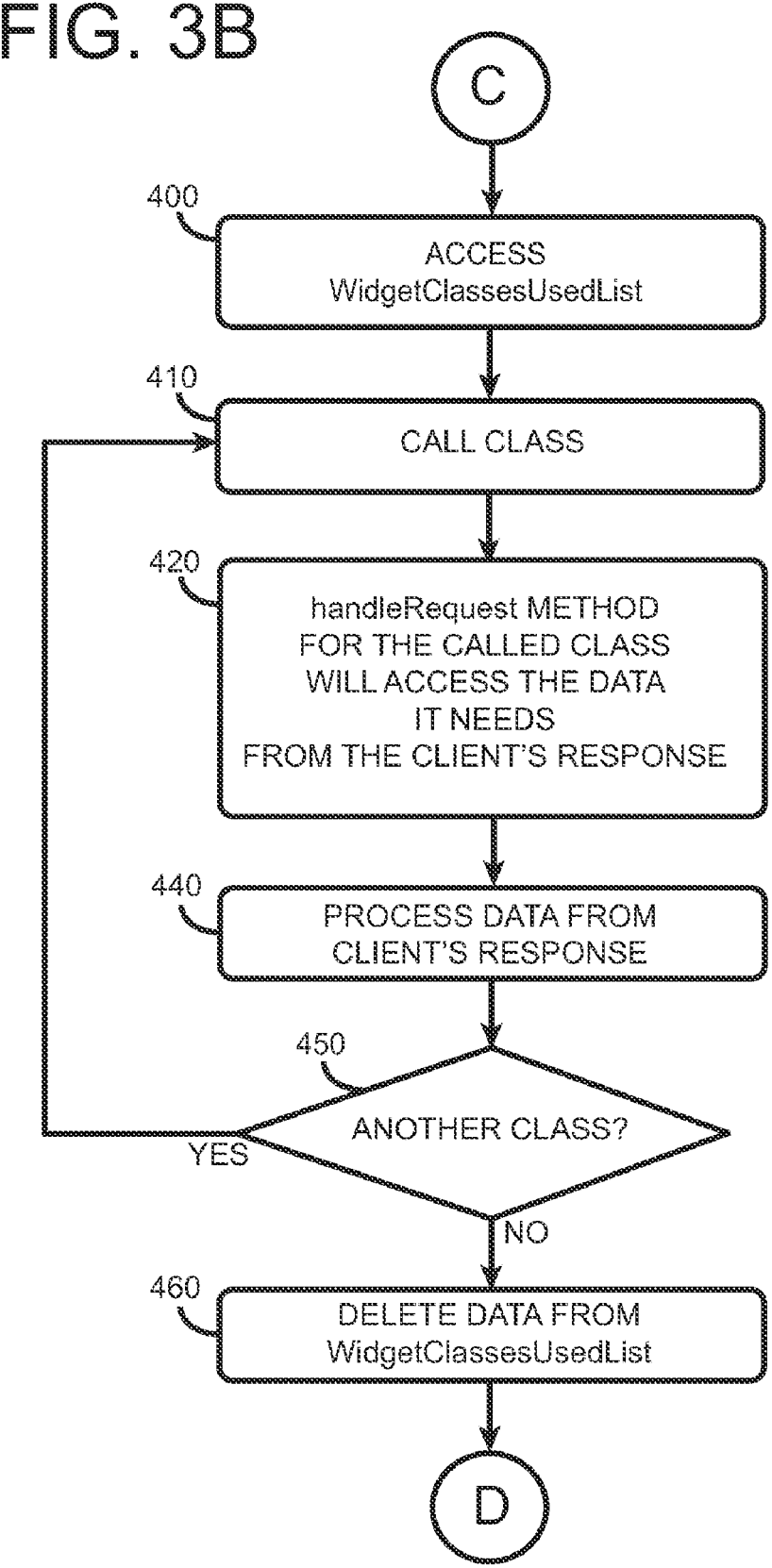

METHOD, APPARATUS AND COMPUTER PROGRAM PRODUCT FOR PROCESSING RESPONSES TO A WEB PAGE

BACKGROUND

The disclosures herein relate generally to processing responses to a web page.

It is known to create web applications based on Java™ Servlet technology. Such a web application uses HTML to present information to a client device via an Internet browser. The HTML presented to the browser can be created explicitly from Java Servlet Pages (JSPs) by using HTML, JSTL or custom tag libraries. (Java and all Java-based trademarks are trademarks of Sun Microsystems.)

HTML is however stateless. Consequently there is no link between the HTML presented to the user and the Servlet that handles any actions requested by the user. For example, a user may be presented with an HTML form including a number of fields. A form (or other web page) includes a number of HTML tags. These tags are typically used to render the form appropriately at a receiving client. The form is hosted by a server which is in communication with the user's client device. Once the server sends the form to the client, the server no longer has any knowledge of what it has sent.

When the client user fills in a field in the form online, the data that the client user inputs to the form is sent back to the server. The user expects the server to know what to do with the returned data from the client. Because of the stateless nature of HTML, the associated action handling must be developed independently. It is up to the developer to ensure that the Servlet is capable of handling any requests that arrive from the client. This means that although a library of re-useable widgets can be provided, there is no guarantee that the actions they provide will be handled correctly (if indeed at all). Current solutions to this problem are customer written and there is no framework or standard addressing it. This means that while rendering the HTML for each tag is simple, processing the resulting action is not.

BRIEF SUMMARY

Preferably, the server receives a request from the client for the web page and an indication of a widget used to generate an element of the web page is stored in storage by the server. The server sends the web page to the client. In one embodiment, the widget (e.g. the fully qualified name of a widget class with zero-argument constructor or an instance of the widget) is stored in storage in a list of widgets that the server used to generate elements of the web page. The widget that the server used to generate an element of the web page may include a custom tag.

In another embodiment, an apparatus is provided for processing responses to a web page, the web page being at least partially generated from one or more widgets by a server, each widget denoting how an element of the web page is to be displayed at a client. The apparatus includes a component that receives a response to the web page from the client. The apparatus also includes a component that identifies a widget used to generate an element of the web page that was provided to the client. The apparatus further includes a component for executing action processing logic associated with the widget used to generate an element of the web page, the action processing logic for the widget using data being received in the response and performing an action with respect to that data. Preferably, such widgets are reusable. This means that the widgets are granular, transferable components that may be provided by third parties as well as being custom written by developers.

The disclosed methodology may be implemented in computer software as a computer program product. The computer program product includes a computer readable storage medium. The computer program product also includes first program instructions that generate a web page from one or more widgets, each widget denoting how an element of the web page is to be displayed at a client. The computer program product further includes second program instructions that provide the web page to the client. The computer program product still further includes third program instructions that receive a response to the web page from the client. The computer program product also includes fourth program instructions that identify a particular widget used to generate an element of the web page that was provided to the client. The computer program product further includes fifth program instructions that execute action processing logic associated with the widget used to generate an element of the web page, the action processing logic for the widget using data received in the response and performing an action with respect to that data. The first, second, third, fourth program and fifth instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 2 is a flowchart showing process steps in one aspect of the disclosed methodology.

FIG. 3B is a flowchart showing process steps in yet another aspect of the disclosed methodology.

DETAILED DESCRIPTION

Java Servlet Pages (JSPs) provide a mechanism to dynamically generate web pages in response to client requests. A JSP may invoke any one of a number of built-in functions using markup tags. A JSP tag library may be used by a developer to extend the pre-provided functionality. The tags that make up such a library are "custom tags".

Figure 1:
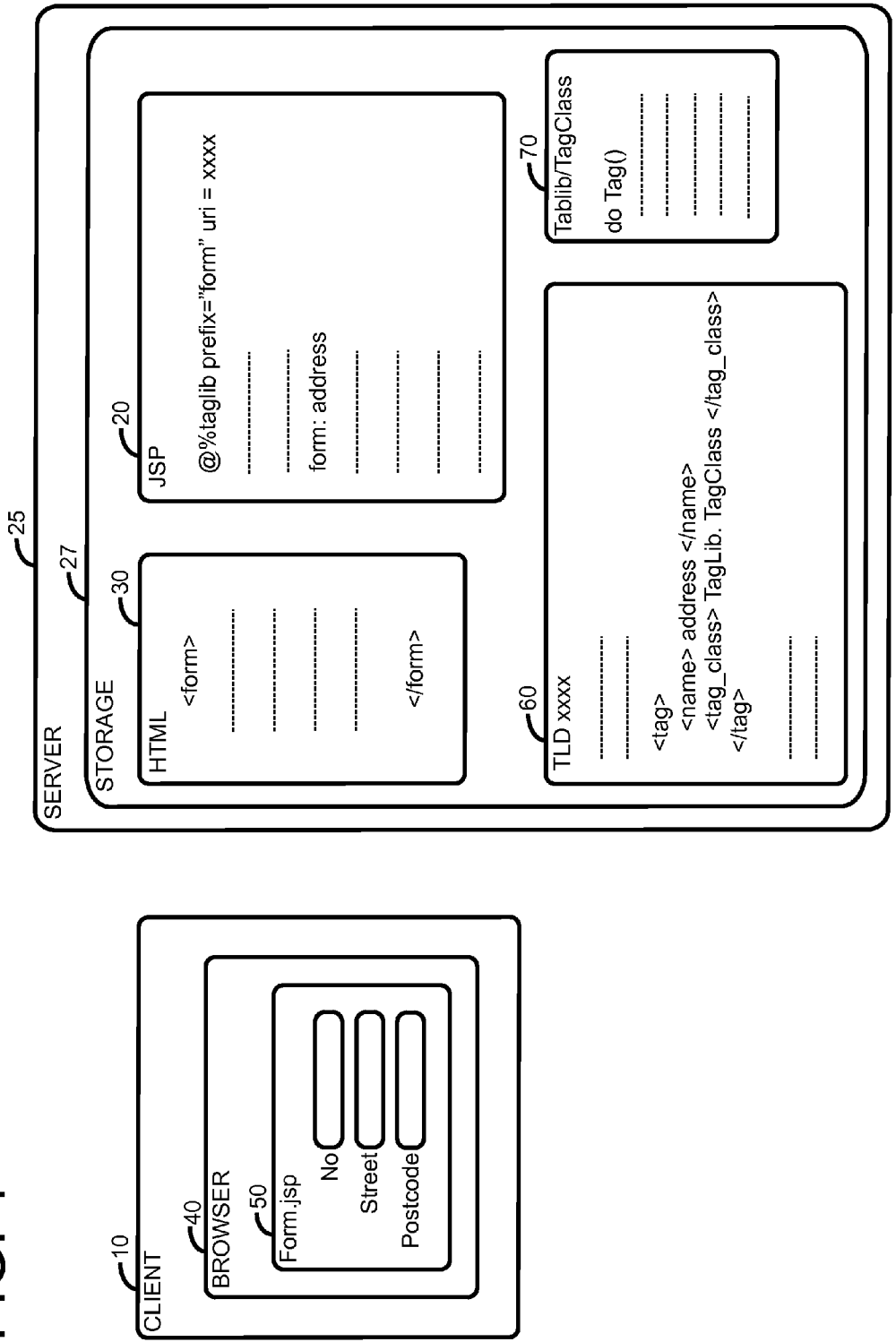
FIG. 1 is a representation of a client and server that shows the operation of custom tags.

FIG. 1 provides a simplified illustration of a client-server apparatus showing how custom tags work in one embodiment of the disclosed methodology. A client 10 requests access to a JSP 20 stored on a server 25. The JSP 20 generates HTML content 30 for rendering on the client's browser 40 as Form.jsp 50. Form.jsp 50 displays, among other things, number, street and postcode input fields.

To generate the HTML content 30, JSP 20 includes one or more custom tags. These tags are defined by a developer and enable the creator of the JSP to tailor the rendering of certain page elements at the client's browser. One such custom tag may be an "address" tag which may define how to present address fields as part of form.jsp 50. Each custom tag is described in a "Tag Library Descriptor" file (or TLD 60). In JSP 20, a custom tag is referenced with a prefix (e.g. <prefix: tagname>. In this instance, the prefix is "form". Such a prefix then maps to a TLD URI xxxx. Thus, the complete instruction shown in JSP 20 is:

@%taglib prefix="form" uri=xxxx

The prefix prefaces any custom tags within the JSP. Thus, JSP 20 has a custom tag "address" which has the prefix "form". "Form" then maps to uri xxxx which points to TLD file 60.

TLD file 60 may define multiple custom tags and each definition includes the tag name "address", the tag handler (a Java class—"TagLib.TagClass") and other information (including valid attributes, etc.) which are not shown in FIG. 1. Each tag handler 70 extends the SimpleTagSupport abstract class and implements a doTag( ) method. When a web container is parsing a JSP and encounters a custom tag, it does the following:

1. Looks to see if the tags prefix is mapped to a uri;
2. Looks through a set of valid locations in the web application that TLDs can be stored and attempts to find the TLD with the uri mapped to the prefix;
3. When it finds the correct TLD, it searches through the TLD for the correct tag definition;
4. When it finds the tag definition, it checks that the attributes in the tag are valid; and
5. If the tag attributes are valid, it then calls the doTag( ) method on the tag handler;

As discussed above, the HTML presented to the browser can be created explicitly or generated from JSPs by using HTML, JSTL or custom tag libraries. The associated action handling for processing any information received from the client 10 is however developed independently. This means that although a library of re-usable widgets can be provided to render information at the client, there is no guarantee that the response to information received from the client will be handled by the server 25 correctly (if indeed at all) without the disclosed methodology.

In a preferred embodiment, the disclosed methodology extends the "Servlet" and "Custom Tag" APIs to ensure that an associated action is provided for each tag and that the servlet at the server 25 automatically processes an action for each use of the tag. The advantages of this system are that a library of tags can be provided to a web developer and both the display rendering AND action processing are properly defined. This guarantees that BOTH the presentation and resulting behavior is consistent wherever the tags are used.

To implement the disclosed methodology, in a preferred embodiment, an abstract class "Widget" is created that extends the SimpleTagSupport class. SimpleTagSupport is the interface to which all custom tags are required to conform. A custom tag typically calls a doTag( ) method which enables the developer owning the custom tag to include logic for rendering certain information appropriately on a user's screen—e.g. address fields. The abstract class implements doTag( ) so that it stores a tag handler (Java class) in volatile storage 27. In other words, an instance of the tag class is stored in an instance of a WidgetClassesUsedList class (a list). Every tag used will update the list with an instance of the tag handler (class) that implements that tag. Thus, volatile storage 27 in server 25 keeps a list of tags and associated implementing classes.

It will be appreciated that doTag( ) has now been modified. doTag( ) is also preferably finalized to prevent anybody from overriding the new functionality that has been provided. Nevertheless, to enable developers to include appropriate rendering logic for a particular custom tag, doTag( ) declares an abstract method of its own doWidgetTag( ). The doWidgetTag( ) method therefore provides a placeholder for the developer to include any rendering logic that doTag( ) would have previously contained. Thus, doTag( ) and doWidgetTag( ) (when implemented) deal with providing outgoing HTML from the server 25 to the client device 10.

As indicated, there is often a disconnect between the outgoing data sent by a server and any data received by way of a response from the client. For example, a form may be provided by a server to the user, but there is often no guarantee that the server will know what to do with form data when it is input by the user and returned to the server. In JSP terms, javax.servlet.http.HttpServlet class normally processes data received by a client device. What a servlet does is up to the implementing developer. However, there is typically one servlet per page and a particular servlet deals with all data received for a particular page.

In a preferred embodiment, the disclosed methodology includes a WidgetHandler class which extends the HttpServlet class to provide additional functionality. WidgetHandler provides a doPost method as HttpServlet already does. However, doPost( ) now includes logic which calls a handleWidgetRequests( ) method. doPost( ) is also finalized so that it may not be overwritten. doPost( ) further provides an abstract class doWidgetPost( ) which provides a placeholder for a developer to determine how data relating to the entire page should be handled. In other words, doWidgetPost( ) replaces doPost( ).

The handleWidgetRequests( ) method accesses the list of tag classes used in initially rendering information at the client 10 and which resulted in the particular response just received by server 25 from that client 10. The system iterates over each class instance stored in the list and calls the handleRequest( ) method on each element. This method must be implemented by a developer conforming to the Widget method and will indicate how any received data should be processed. The disclosed methodology provides a framework for ensuring that there is a strong association between rendering logic and action logic.

Figure 3A:
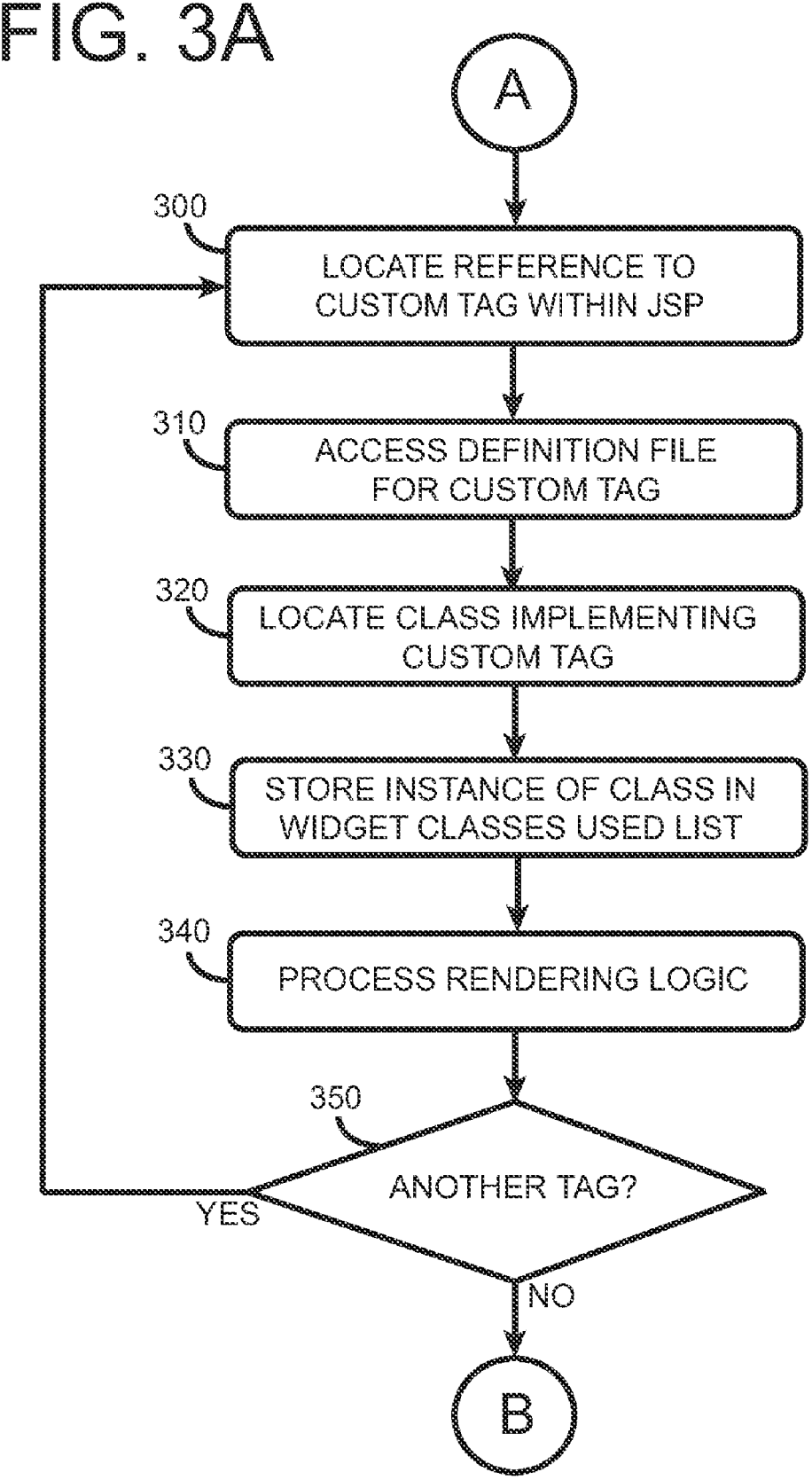
FIG. 3A is a flowchart showing process steps in another aspect of the disclosed methodology.

The flowcharts of FIGS. 2, 3A and 3B illustrate runtime processing that occurs in the disclosed methodology. More particularly, the flowchart of FIG. 2 starts with server 25 receiving a request from client 10, as per block 200. Server 25 locates or provides the requested JSP, as per block 210. Server 210 parses the JSP, as per block 220. Block 210 refers to A and B that provide more detail with respect to locating the JSP, as per the flowchart of FIG. 3A, discussed in more detail below. Returning to FIG. 2, server 25 generates HTML as a result of the parsing process and sends this HTML to client 10 for rendering, as per block 230. Server 25 receives a response from client 10, as per block 240, and processes the response, as per block 250. Block 250 refers to C and D that provide more detail with respect to the server's processing of the client's response, as per the flowchart of FIG. 3B, discussed in more detail below. Processing then continues. The processing may involve sending additional data to the client using custom tags to generate the HTML or another request may be received from the client.

As explained above, the parsing of the originally requested JSP is described in more detail with respect to the flowchart FIG. 3A. Parsing of the JSP may involve a variety of processing, but only the processing of custom tags will be described herein since this is most relevant to the disclosed methodology. Server 25 locates a reference to a custom tag within the JSP, as per block 300. Server 25 accesses the definition file for the custom tag, as per block 310. Server 25 then locates the class which implements the custom tag, as per block 320. Server 25 stores an instance of this class in the WidgetClassesUsedList which is held in volatile storage 27. Once this has been done, the rendering logic associated with the custom tag's class is then processed as normal, as per block 340. Server 25 then makes a determination as to whether there are any more custom tags to parse, as per decision block 350. If the answer is yes, then processing loops around to step 300. Otherwise, processing returns to block 230 of FIG. 2 via B in order that HTML generated from the parsing of the JSP can be generated and sent to the client, as per block 230, of the flowchart of FIG. 2.

FIG. 3B illustrates the processing that occurs in server 25 in response to receipt of data from the client 10. A response from the client 10 will have been initiated by the HTML data sent to the client at step 230. Thus, the client 10 may have filled in information in a number of form fields and this data will all be received back at a processing servlet "WidgetHandler" in the server, as discussed above. This servlet accesses the WidgetClassesUsedList, as per block 400, and calls the first class listed, as per block 410. As previously mentioned, WidgetClassesUsedList stores a list of classes that implement the rendering logic that caused a page to be displayed to and at the client, in response to the client's previous request. These classes have been further modified such that they also include action processing logic. Thus, there is a link between information displayed to the client and the processing that is to be performed when the client provides a response to a particular piece of rendered information.

Block 420 explains that the handleRequest method for the called calls will access (extract) the data it needs from the client's response. What data a handleRequest method requires is ultimately up to the developer implementing this method. However, by way of example, if the HTML output from the class's doWidgetTag( ) creates a text box with a property of "name", then the handleRequest method for the same class will look for a request parameter of "name".

Server 25 processes the data extracted from the client's response, as per block 440, and then makes a determination as to whether another class is listed, as per decision block 450). If the answer is yes, then processing returns to block 410. Otherwise, server 25 deletes the list of classes from WidgetClassesUsedList at block 460 since these are only stored on a per exchange pair basis (i.e. for HTML generated and sent by the server 25 to the client 10 and the resulting data received back from the client 10). This methodology saves storage space. Processing then returns to the flowchart of FIG. 2 via D.

Thus, a new architecture for associating rendering logic with processing logic has been described, together with the processing that actually occurs when this architecture is implemented. It will be appreciated that while the disclosed methodology is described in terms of JSPs and custom tags, this is by way of example only, showing the link between rendering logic and action logic.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A web server, comprising:

a storage that includes:

first instructions that generate a web page from one or more widgets, each widget denoting how an element of the web page is to be displayed at a client;

second instructions that provide the web page to the client;

third instructions that receive a response to the web page from the client;

fourth instructions that identify a particular widget used to generate an element of the web page that was provided to the client;

fifth instructions that execute action processing logic associated with the particular widget used to generate the element of the web page, the action processing logic for the particular widget using data received in the response and performing an action with respect to that data; and sixth instructions that store an indication of the particular widget used to generate an element of the web page that was provided to the client;

wherein the sixth instructions store in a list of widgets an indication of the particular widget used to generate the element of the web page that was provided to the client;

wherein the sixth instructions delete from the list of widgets the indication of the particular widget used to generate an element of the web page that was provided to the client.

2. The web server of claim 1, wherein the particular widget used to generate an element of the web page includes a custom tag.

3. The web server of claim 1, wherein the one or more widgets are reusable.

4. A computer program product, comprising:

a non-transitory computer readable storage medium;

first program instructions that generate a web page from one or more widgets, each widget denoting how an element of the web page is to be displayed at a client;

second program instructions that provide the web page to the client;

third program instructions that receive a response to the web page from the client;

fourth program instructions that identify a particular widget used to generate an element of the web page that was provided to the client; and fifth program instructions that execute action processing logic associated with the particular widget used to generate an element of the web page that was provided to the client, the action processing logic for the particular widget using data received in the response and performing an action with respect to that data;

sixth program instructions that store an indication of the particular widget used to generate an element of the web page that was provided to the client;
wherein the sixth program instructions store in a list of widgets an indication of the particular widget used to generate the element of the web page that was provided to the client;
wherein the sixth instructions delete from the list of widgets the indication of the particular widget used to generate an element of the web page that was provided to the client;

wherein the first, second, third, fourth program and fifth instructions are stored on the computer readable storage medium.

5. The computer program product of claim 4, wherein the particular widget used to generate an element of the web page includes a custom tag.

6. The computer program product of claim 4, wherein the one or more widgets are reusable.

* * * * *